United States Patent [19]

Kawashima et al.

[11] Patent Number: 5,260,786
[45] Date of Patent: Nov. 9, 1993

[54] NON-INTERLACE TELEVISION FOR MULTI-COLOR STANDARDS

[75] Inventors: Hiroyuki Kawashima, Tokyo; Hiroyuki Kita, Kanagawa; Shuichi Obana, Kanagawa; Masaharu Tokuhara, Kanagawa, all of Japan

[73] Assignee: Sony Corporation, Tokyo, Japan

[21] Appl. No.: 779,810

[22] Filed: Oct. 21, 1991

[30] Foreign Application Priority Data

Oct. 22, 1990 [JP] Japan ................... 2-283686

[51] Int. Cl.$^5$ .......................... H04N 5/46; H04N 7/01
[52] U.S. Cl. ........................... 358/140; 358/11
[58] Field of Search ................ 358/31, 36, 37, 166, 358/140, 11, 12, 17, 327–330

[56] References Cited

U.S. PATENT DOCUMENTS

| 3,832,487 | 8/1974 | de Niet | 358/140 |
| 4,739,390 | 4/1988 | Achiha et al. | 358/11 |
| 4,821,112 | 4/1989 | Sakamoto et al. | 358/17 |
| 4,870,482 | 9/1989 | Yasuki et al. | 358/31 |
| 4,970,601 | 11/1990 | Achiba | 358/330 |

FOREIGN PATENT DOCUMENTS

| 60-130295 | 11/1985 | Japan . |
| 2177689 | 10/1990 | Japan . |
| 2078054 | 12/1981 | United Kingdom . |

OTHER PUBLICATIONS

Patent Abstracts of Japan, vol. 13, No. 86 (E-720) [3434]m Feb. 28, 1989 (Tsuchida).

*Primary Examiner*—James J. Groody
*Assistant Examiner*—Glenton B. Burgess
*Attorney, Agent, or Firm*—Lewis H. Eslinger; Jay H. Maioli

[57] ABSTRACT

A video signal processing circuit used for a non-interlace television comprises an interfield interpolation circuit for carrying out interfield interpolation by using a video signal before one field of an input video signal to output interpolated line video signals corresponding to respective interline positions in one field. An intrafield interpolation circuit carries out intrafield interpolation by using video signals of a plurality of lines of the input video signal to output interpolated line video signals corresponding to respective interline positions in one field. A motion detector detects motion of the input video signal, and a weighting adder implements weighting to an output signal from the interfield interpolation circuit and an output signal from the intrafield interpolation circuit in accordance with a signal from the motion detector to add the weighted output signals. A sequential scan converter carries out conversion into a sequential scanning signal on the basis of the input video signal and an output signal from the weighting adder, and a controller controls at least the interfield interpolation circuit in accordance with a television standard system of the input video signal, thereby making it possible to lessen disturbance, e.g., deterioration in the picture quality, etc., occurring in the interlaced scanning.

5 Claims, 3 Drawing Sheets

NON-INTERLACE TELEVISION FOR MULTI-COLOR STANDARDS

BACKGROUND OF THE INVENTION

1. Field of the Invention

This invention relates to a non-interlace television for multi-color standards, and more particularly to a video signal processing circuit for carrying out sequential scanning, so called non-interlaced scanning suitable for such a television.

2. Description of the Prior Art

As the standard system of the television broadcasting system, there are known the NTSC system, the PAL/SECAM systems, and the like. Video signals of these standard systems carry out interlaced scanning to constitute pictures.

The relationship between time and respective lines in the fields in such an interlaced scanning is shown in a model form in FIG. 5.

In the case of the interlaced scanning, by carrying out the vertical scanning twice, one picture is constituted. Each vertical scanning is called a field scanning. For example, in the case of the television signal of the NTSC system, since the number of lines is 525, the number of lines by each vertical scanning is 262.5.

In FIG. 5, the time t is taken on the abscissa, and horizontal scanning lines (lines) of which vertical positions are determined in accordance with the vertical scanning in a picture of the television are taken on the ordinate V wherein these lines are represented by circular marks 40 of the solid-lines, respectively. Respective fields are indicated every time interval T. Further, since the interlaced scanning is carried out, lines of the next field 42 subsequent by one field to respective horizontal scanning lines (lines) of the field 41 are arranged so as to fill the portions between respective lines of the field 41 earlier than the field 42 by one field. As stated above, in the interlaced scanning, one frame is constituted by two fields, e.g., fields 41 and 42. Accordingly, the number of lines in one field is (525/2) in the case of the NTSC system as stated above, and is (625/2) in the case of the PAL/SECAM systems. Further, when respective television systems are viewed in terms of the field scan interval T, in the case of the NTSC system, field scanning every (1/60) sec., i.e., field scanning of 60 fields/sec. is carried out. On the other hand, in the case of the PAL/SECAM systems, field scanning every (1/50) sec., i.e., field scanning of 50 fields/sec. is carried out.

As stated above, the line scanning system varies in dependency upon a television standard system adopted. Particularly, in the NTSC system having a smaller number of lines, e.g., at the boundary in the vicinity of a vertical scanning, the portion on the upper side thereof is a black region and the portion on the lower side thereof changes to a white region. In the case of such a picture to uniformly change in a lateral direction of the picture, a phenomenon such as a line flicker such that it looks like that its edge portion fluctuates, etc. occurs, resulting in lowered picture quality. In order to improve such an undesired picture quality, various systems such as the sequential scanning system, etc. are proposed.

In the case of television signals of the NTSC system, for example, as represented by the so-called clear vision, in order to improve the picture quality, the motion adaptive non-interlace signal processing technology is used with a view to elimination of the above-described line flicker disturbance, and improvement in the vertical resolution. Accordingly, when such a non-interlace signal processing technology, is employed, a picture free from flicker and having a high vertical resolution can be constructed.

On the other hand, signals of the PAL system and the SECAM system have a low field frequency of 50 Hz. Since, such signals can constitute only 25 pictures in one second, a human being may visually recognize flicker over the entirety of the picture, i.e., so called face flicker. As the method of improving the picture quality against a face flicker, a flicker free technology to drive signals at a field frequency of 100 Hz is used.

Meanwhile, in recent years, there have been many implementations of a large screen of the television also in televisions of the PAL system and the SECAM system. In a large screen like that of an NTSC projector system, line flicker is more conspicuous than face flicker.

SUMMARY OF THE INVENTION

With the above-described problems in view, an object of this invention is to provide a non-interlace television for multi-color standards, which is capable of lessening deterioration in the picture quality such as flicker, or lowered vertical resolution, etc. even in the case there is employed any one of plural kinds of television signals of the NTSC system, and the PAL/SECAM systems, etc.

To achieve the above-mentioned object, in accordance with this invention, there is provided a non-interlace television for multi-color stands comprising: a field memory connected to an input terminal for a video signal, a line memory connected to the input terminal for the video signal, a motion detector connected to the input terminal for the video signal, and for detecting motion of an image of the video signal inputted thereto, and memory control means for controlling the field memory and the line memory.

DESCRIPTION OF THE PREFERRED EMBODIMENT

Explanation will now be given with reference to the attached drawings in connection with an actual embodiment of this invention.

Figure 1:
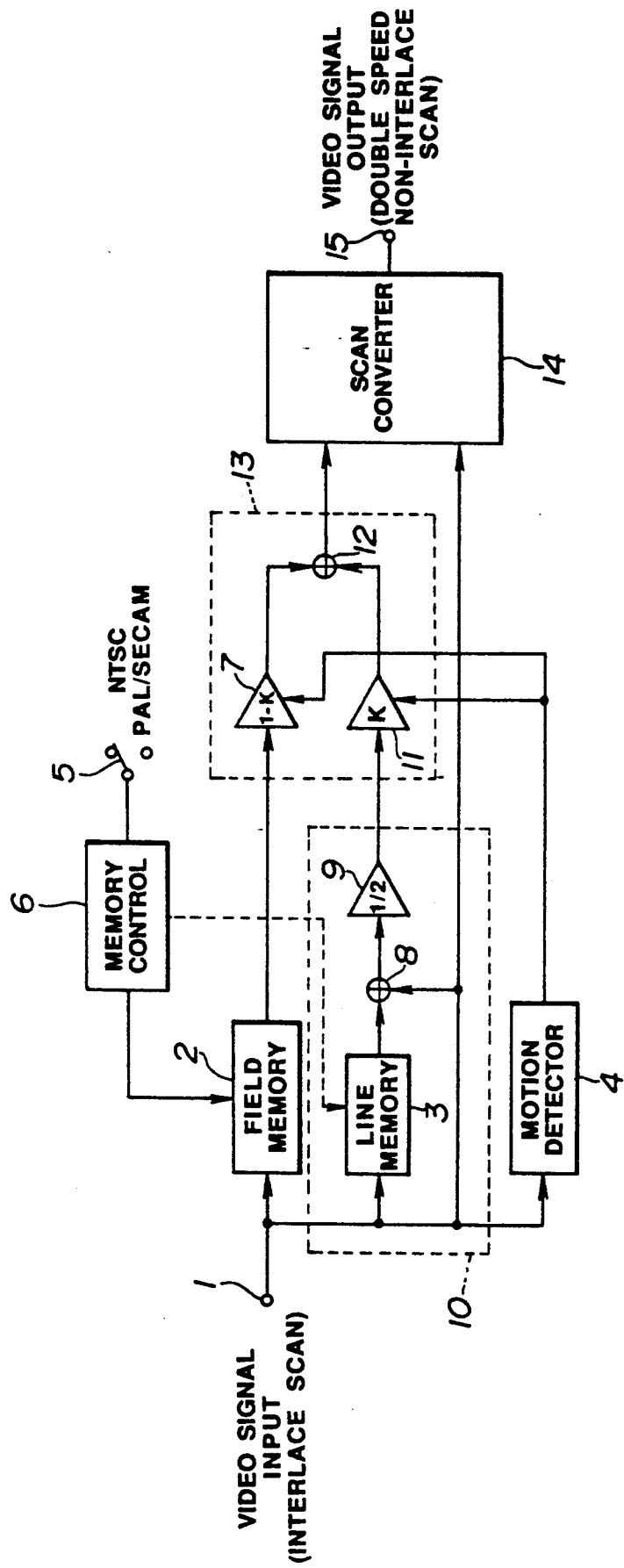
FIG. 1 is a block diagram showing a hardware configuration of the essential part of an embodiment of a video signal processing circuit according to this invention.

A preferred embodiment of a video signal processing circuit for carrying out a motion adaptive non-interlaced scanning according to this invention is shown in FIG. 1.

Any one of plural kinds of video signals different from each other is delivered as a video signal to this video signal processing circuit. For example, either a video signal of the NTSC system or a video signal of the PAL system or the SECAM system is delivered to the input terminal 1. This input video signal is delivered to a field memory 2 serving as interfield interpolation means for carrying out an interfield interpolation by using a video signal in a field earlier by one field to output interpolated line video signals corresponding to respective interline positions in a field, an intrafield interpolation signal formation block 10 serving as intrafield interpolation means for carrying out an intrafield interpolation by using video signals of a plurality of lines of the input video signal to output interpolated line video signals corresponding to respective interline positions in a field, a motion detector 4 serving as motion detector means for detecting motion of the input video signal, and a scan converter 14 serving as sequential scan converter means.

Whether the above-mentioned input video signal is of the NTSC system or the PAL/SECAM system is switched by means of a switch 5. A switching signal by this switch 5 is delivered to a memory control 6. The number of delay stages of the memory control circuit 6 is controlled in accordance with the above switching, i.e., the television system selected by switching. An output signal from the memory control circuit 6 is delivered to at least the field memory 2. Thus, a delay quantity of the input video signal in the field memory 2 is controlled.

A weighting addition block 13, which serves as weighting adder means for implementing weighting to an output signal from the field memory 2 and an output signal from the intrafield interpolation formation block 10 in dependency upon an output signal from the motion detector 4 to add the weighted output signals, implements weighting addition to an interfield interpolated signal and an intrafield interpolated signal, thus to form an interpolated line signal.

The scan converter 14, which serves as the sequential scan converter means for carrying out conversion into a sequential scanning signal on the basis of the input video signal and an interpolated line signal from the weighting addition block 13, interchangeably scans lines of the input video signal and the interpolated lines at a double speed to thereby carry out conversion into non-interlaced (sequential) scanning. The scan converter 14 delivers a double speed non-interlace signal to the output terminal 15.

In this embodiment, the above-mentioned intrafield interpolation formation block 10 comprises a line memory 3, an adder 8, and a multiplier 9. Further, the above-mentioned weighting addition block 13 comprises multipliers 7 and 11, and an adder 12.

In this video signal processing circuit, signal processing for forming respective interpolated lines is carried out.

Interpolated lines prepared by the video signal processing circuit shown in FIG. 1 are formed by plural kinds of video signals inputted thereto. How these interpolated lines are formed on the basis of an input video signal will now be described with reference to FIGS. 2 and 3.

Figure 2:
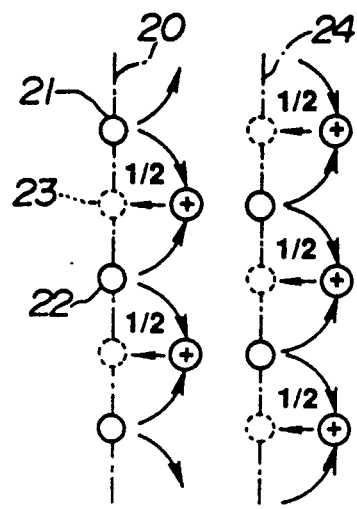
FIG. 2 is a model view for explaining an intrafield interpolation.
Figure 3:
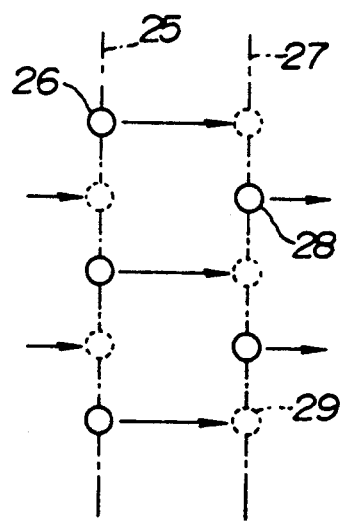
FIG. 3 is a model view for explaining an interfield interpolation.
Figure 5:
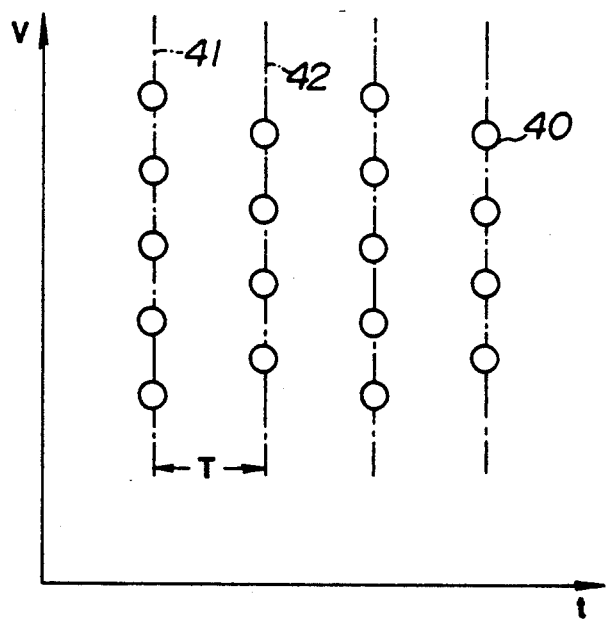
FIG. 5 is a model view showing the structure of interlaced scanning lines in a conventional television standard system.

In the model views of FIGS. 2 and 3, the abscissa represents time and the ordinate represents a vertical position on a picture as shown in FIG. 5. Further, interpolated lines are represented by circular marks of dotted lines, and lines of the input video signal are represented by circular marks of the solid line.

In the intrafield interpolation formation block 10, intrafield interpolation is carried out as follows. Namely, as shown in FIG. 2, data of interpolated lines are formed from lines adjacent in upper and lower directions. To realize this, the intrafield interpolation formation block 10 operates so as to input a line before 1H in the same field to the line memory 3 to carry out 1H delay thereof. For example, data of the line 21 in the field 20 shown in FIG. 2 is inputted to the line memory 3 shown in FIG. 1. By using this line memory 3, the above-mentioned inputted data of the line 21 is delayed by time of 1H, and is then outputted from the line memory 3. The delayed data of the line 21 and data of the next line 22 in the same field are added at the adder 8. Further, in order to obtain an average value of the lines 21 and 22, calculation processing for multiplying the added output signal by the coefficient ($\frac{1}{2}$) is implemented to that added output signal at the multiplier 9. By this signal processing, data of an interpolated line to be inserted into the position between lines 21 and 22 is formed. This signal processing is similarly repeatedly carried out between respective lines subsequent thereto. Further, also in the next field 24, in a manner similar to the above, calculation processing between lines is carried out. For example, at the vertical scanning position of the line 21 which has shown a video signal in the above-mentioned field 20, an intrafield interpolated signal in this field 24 is formed. These intrafield interpolated signals thus formed are delivered to the scan converter 14 through the weighting addition block 13. In the scan converter 14 serving as the sequential converter means, scanning is carried out at a double speed so as to insert an interpolated line 23 between lines of the input video signal in the same field, e.g., between the line 21 before one line of the line 22 and the line 22.

Further, in the case of the interfield interpolation shown in FIG. 3, lines of one field in the field 25 positioned earlier by one field than the field 27 to be interpolated are taken into the field memory 2 in accordance with the control by the memory control 6. By applying a double speed conversion to outputs from the field memory 2 through the weighting addition block 13, interpolated lines 29 (indicated by circular marks of dotted lines) are inserted into the portions between lines 28 represented by circular marks of the solid line of the field 27 to be interpolated.

Respective multipliers of the weighting addition block 13 which has been described with reference to FIGS. 2 and 3 operate as follows. Namely, the weighting coefficients of the multipliers 7 and 11 are controlled in dependency upon an output signal outputted from the motion detector 4 on the basis of plural kinds of video signals inputted to the motion detector 4. To the multiplier 7 to which the interfield interpolated signal is inputted, weighting is implemented in accordance with a signal from the motion detector 4 so that it takes a value, e.g., (1−K) times greater than that input value. Further, to the multiplier 11 to which an intrafield interpolation signal is inputted, weighting is implemented so that it takes a value, e.g., K times greater than that input value.

Further, the motion detector 4 carries out a control so that the sum total of, e.g., the weighting coefficient (1−K) of the multiplier 7 with respect to the above-mentioned intrafield interpolated signal and, e.g., the weighting coefficient K ($0 \leq K \leq 1$) of the multiplier 11 with respect to the above-mentioned interfield interpolated signal satisfies the condition expressed as $(1-K)+K=1$.

A signal delivered to the multiplier 7 of FIG. 1 is stored data in one field. Namely, since data in the memory is switched every field, such data is suitable for correction of a picture having less motion. On the other hand, since a signal delivered to the multiplier 11 of FIG. 1 carries out interpolation between lines in the same field, such a signal is suitable for correction of a picture having a motion.

Accordingly, as an extreme example, in the case of a signal of a still picture such that an inputted video signal has no motion, the motion detector 4 sets K to, e.g., 0 by a control signal delivered to the multiplier 7, thus allowing the weighting coefficient (1-K) of the multiplier 7 to be equal to 1. On the other hand, in the case of a signal of a moving picture in which an inputted video signal has many components including sudden motion, the motion detector 4 sets the weighting coefficient K to, e.g., 1 by a control signal from the motion detector 4 to the multiplier 11. As stated above, the weighting coefficient control of these multipliers permits smooth transition between two states of the intrafield interpolation signal and the interfield interpolation signal in accordance with the control using an output signal from the above-described motion detector 4. Further, in order to provide an optimum picture quality, the respective multiplied outputs are added at the adder 12. By this additive operation, signal levels of lines of an inputted video signal and interpolated lines can be in conformity with the standard within a range of the same level.

The system in which the video signal processing is carried out in accordance with the control based on motion detection is called a motion adaptive non-interlace system.

In this embodiment, the field memory 2 and the line memory 3 employ a line lock system for locking a clock serving as a reference so that it is in correspondence with a horizontal synchronizing signal (H signal, frequency $f_H$). The horizontal synchronizing frequency $f_H$ is 15.734 KHz in the case of the NTSC system and 15.625 KHz in the case of the PAL/SECAM system. These two horizontal synchronizing frequencies $f_H$ are different as described above. However, since the clock frequency used in a television has an allowed range so as to pull in the frequency with a slight margin and lock it, even if there is employed an approach to fix the sampling clock frequency, e.g., at a value 910 times larger than the horizontal synchronizing frequency $f_H$ of the NTSC system, i.e., 910 $f_H$, the line memory 2 can be controlled by such a frequency. With the above-mentioned line lock method, the control of the line memory 3 becomes unnecessary. As a result, the memory control 6 is only required to control the delay quantity (the number of delay stages) of the field memory 2.

Further, in the case of the method of locking the frequency by the line lock system, if the number of samples within a 1H scanning period is the same, by switching and delaying the number of delay stages of the memory control 6 for controlling the field memory 2 so as to become in conformity with the NTSC system and the PAL/SECAM system in correspondence with any input video signals of the two systems irrespective of the television system employed, signal processing which can cope with input video signals of both systems may be carried out.

On the other hand, there is known a method of carrying out locking at a sub-carrier frequency. However, since the number of sampling times of the NTSC system equal to a value 910 times larger than the horizontal synchronizing frequency $f_H$ of the NTSC system, i.e., $f_H=14.318$ MHz, and the number of sampling times of the PAL/SECAM system equal to a value 1135 times larger than the horizontal synchronizing frequency $f_H$ of the PAL/SECAM system, i.e., 1135 $f_H=17.734$ MHz, are different, the numbers of sampling times of 1H differ from each other. For this reason, it is required to switch a clock for carrying out the control of the field memory and the line memory in conformity with respective television systems, and the memory control circuit 6 is required to switch not only the delay quantity (the number of delay stages) of the field memory but also that of the line memory.

Figure 4:
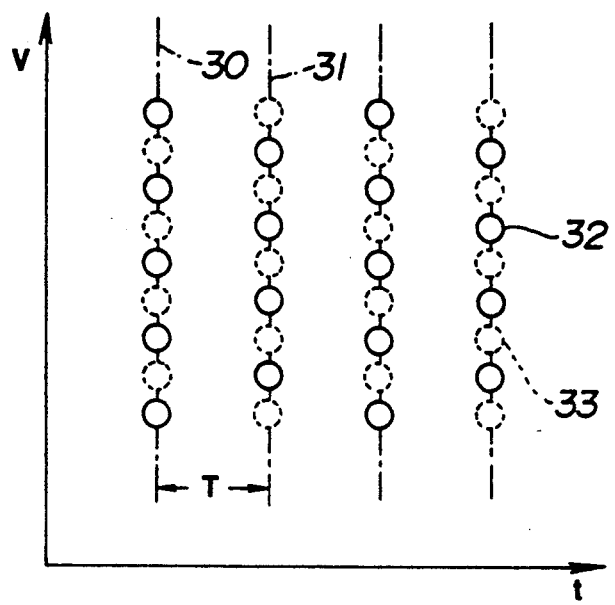
FIG. 4 is a model view showing the structure of non-interlaced scanning lines.

The structure of the motion adaptive non-interlace lines is as shown in FIG. 4. The abscissa and the ordinate are taken in the same manner as in FIG. 5. Their description is omitted.

Circular marks 32 indicated by the solid line represent lines of an inputted video signal. Further, circular marks 33 indicated by dotted lines represent interpolated lines. In addition, the time T indicating the field interval is the same as that of the non-interlaced scanning in connection with the respective systems.

As this time, the operation based on the structure of the motion adaptive non-interlace line is as follows. Namely, an approach is employed to scan, at a double speed, within the same field, lines of an inputted video line and interpolated lines (added outputs obtained by delivering a motion adaptive control signal to each of multipliers 7 and 11 to respectively multiply the intrafield and interfield interpolation signals by weighting coefficients to add respective output signals) as indicated by the field 30 or the field 31. Thus, as compared to the number of lines in one field in the case of the interlaced scanning as shown in FIG. 5, the number of lines in the case of the non-interlaced scanning can become double. Namely, the number of field lines is 525 in the case of the NTSC system, and 625 in the case of the PAL/SECAM systems. The number of lines of the non-interlaced scanning becomes double.

Further, it is said that the vertical resolution capable of discriminating patterns arranged in a vertical direction in a picture of a television is about 480 lines by the approximation from a frequency in a signal at the time of demodulation. Furthermore, this vertical resolution can be also represented by so called Kell factor which is the visual sense factor of the human being. It is further said that this Kell factor is ordinarily about 70%. At this time, the vertical resolution is about 330 lines. In addition, in the case of a picture having a high luminance, the Kell factor is reduced to about 40%.

However, since the number of lines becomes double in the non-interlaced scanning as stated above, the so called Kell factor which is the visual sense factor of the human being can be also improved. Thus, the vertical resolution is remarkably improved.

By carrying out scan conversion in a manner stated above, it is possible to lessen disturbance such as line flicker, deterioration in the vertical resolution, coarse line structure and line crawl, etc. The above-mentioned coarse line structure will now be described. In the interlaced scanning, since a pattern in an early field and that in the subsequent field are different from each other in the case of a moving picture, construction of a picture of one frame by two fields is equivalent to construction of that picture by one field. Namely, since a picture is constructed by the number of lines one half of that in the case of a still picture, there results a coarse picture in the case of the line structure of the interlaced scanning. In a display of such a moving picture, the line structure based on the non-interlaced scanning permits the number of lines in one field to be double to improve the line structure of the interlaced scanning. Thus, the picture quality is still more improved. Further, the above-mentioned line crawl is the phenomenon that lines move from the top to the bottom or from the bottom to the top. Such a cause of lowered picture quality is also eliminated.

In addition, the state of motion of a picture, i.e., whether a picture is a still picture or a moving picture is taken into consideration by using a motion detector. Accordingly, a pictorial image free from an after-image so called double image disturbance occurring in a moving picture can be provided, and a pictorial image of a still picture free from line flicker and having a picture quality of a high vertical resolution can be provided.

As is clear from the foregoing description, the video signal processing circuit according to this invention employs an approach to implement interpolation-scanning to video signals different from each other in accordance with the motion detecting control, thereby making it possible to lessen various disturbances occurring by the interlaced scanning. In addition, since correction can be made in correspondence with a moving picture or a still picture, this video signal processing circuit can provide a pictorial image of a picture quality higher than that obtained by the interlaced scanning.

What is claimed is:

1. A non-interlaced television set compatible with any selected television standard of a plurality of television standards, said non-interlaced television set comprising:

means for selecting a television standard;
   an input terminal for receiving an input video signal;
   a field memory connected to said input terminal and producing a field memory output,
   a line memory connected to said input terminal and producing a line memory output,
   a motion detector connected to said input terminal for detecting motion of an image of said input video signal supplied thereto and modifying said field memory output and said line memory output in response to motion detection, and
   memory control means connected to said selecting means, said field memory and said line memory for controlling said field memory and said line memory in accordance with said selected television standard.

2. A non-interlaced television set as claimed in claim 1 wherein said input video signal has a predetermined scanning frequency and which further comprises a scan converter responsive to an output signal derived from said field memory, said line memory and said motion detector for producing a scanning frequency greater than said predetermined scanning frequency of said input video signal.

3. A non-interlaced television set as claimed in claim 2 which further comprises a first adder for adding said input video signal and said line memory output.

4. A non-interlaced television set as claimed in claim 3 which further comprises a second adder for adding said field memory output and an output signal from said first adder.

5. A non-interlaced television set as claimed in claim 4 which further comprises ratio control means connected between outputs of said field and line memories and an input to said second adder and responsive to an output of said motion detector for controlling a ratio of said field memory output to said output signal from said second adder in such a manner as to emphasize said field memory output at low levels of detected motion and to emphasize said line memory output at high levels of detected motion.

* * * * *